No. 840,142. PATENTED JAN. 1, 1907.
C. H. LEGGETT.
POWDER DISTRIBUTER.
APPLICATION FILED JULY 31, 1906.

3 SHEETS—SHEET 1.

WITNESSES:
Fred White
René Bruine

INVENTOR:
Clinton H. Leggett,
By Attorneys,
Arthur E. Fraser & Usina

No. 840,142. PATENTED JAN. 1, 1907.
C. H. LEGGETT.
POWDER DISTRIBUTER.
APPLICATION FILED JULY 31, 1906.

3 SHEETS—SHEET 2.

WITNESSES:
Fred Zohit
René Bruine

INVENTOR:
Clinton H. Leggett
By Attorneys,
Arthur E. Fraser & Usina

No. 840,142. PATENTED JAN. 1, 1907.
C. H. LEGGETT.
POWDER DISTRIBUTER.
APPLICATION FILED JULY 31, 1906.

3 SHEETS—SHEET 3.

WITNESSES:
Fred White
René Bruine

INVENTOR:
Clinton H. Leggett,
By Attorneys,

UNITED STATES PATENT OFFICE.

CLINTON H. LEGGETT, OF NEW YORK, N. Y.

POWDER-DISTRIBUTER.

No. 840,142.  Specification of Letters Patent.  Patented Jan. 1, 1907.

Application filed July 31, 1906. Serial No. 328,508.

*To all whom it may concern:*

Be it known that I, CLINTON H. LEGGETT, a citizen of the United States, residing in the borough of Manhattan, city, county, and State of New York, have invented certain new and useful Improvements in Powder-Distributers, of which the following is a specification.

This invention relates to distributers for powder or other insecticides, and aims to provide certain improvements therein.

In application Serial No. 265,799 filed by me on June 17, 1905, I have described and claimed a powder-distributer adapted to be drawn by a horse or other animal and provided with means for simultaneously delivering the powder or other insecticide to a plurality of rows of plants. The device therein described is especially adapted for use upon farms of considerable size.

By my present invention I seek to provide a similar apparatus for use where the size of the farm or garden does not warrant the expense of a machine of the capacity of the device shown in such application. To this end I provide a powder-distributer which can be mounted upon any ordinary cart or wagon and will be practically effective for use in gardens of small area.

A further object of my invention is to utilize when desired certain types of hand-dusters (such as the well-known Champion duster) as a part of the device either during manufacture or where a customer is already in possession of such a duster.

To this end my invention consists of certain novel features and arrangements, which are hereinafter more fully set forth.

Figure 1:
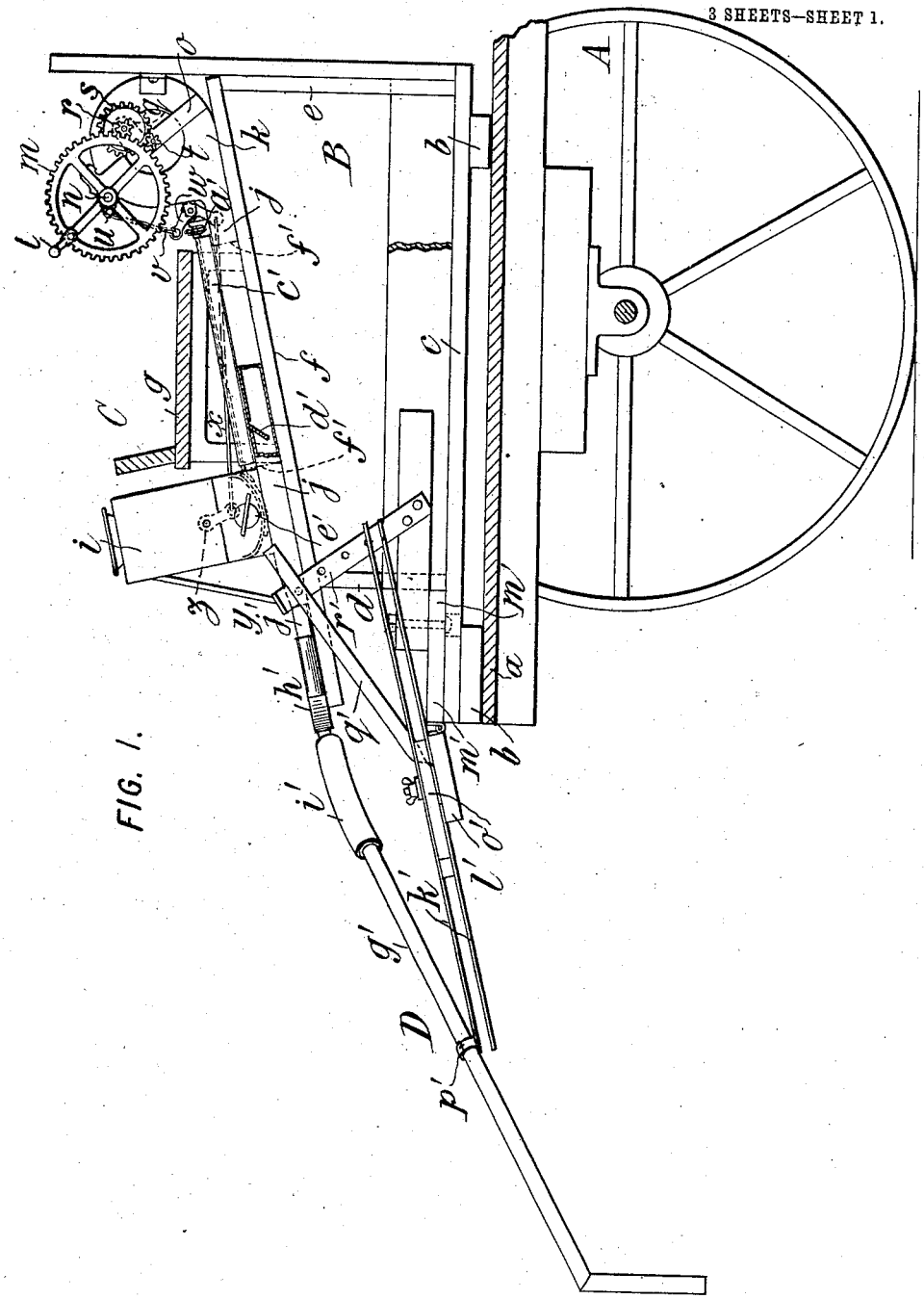
Figure 2:
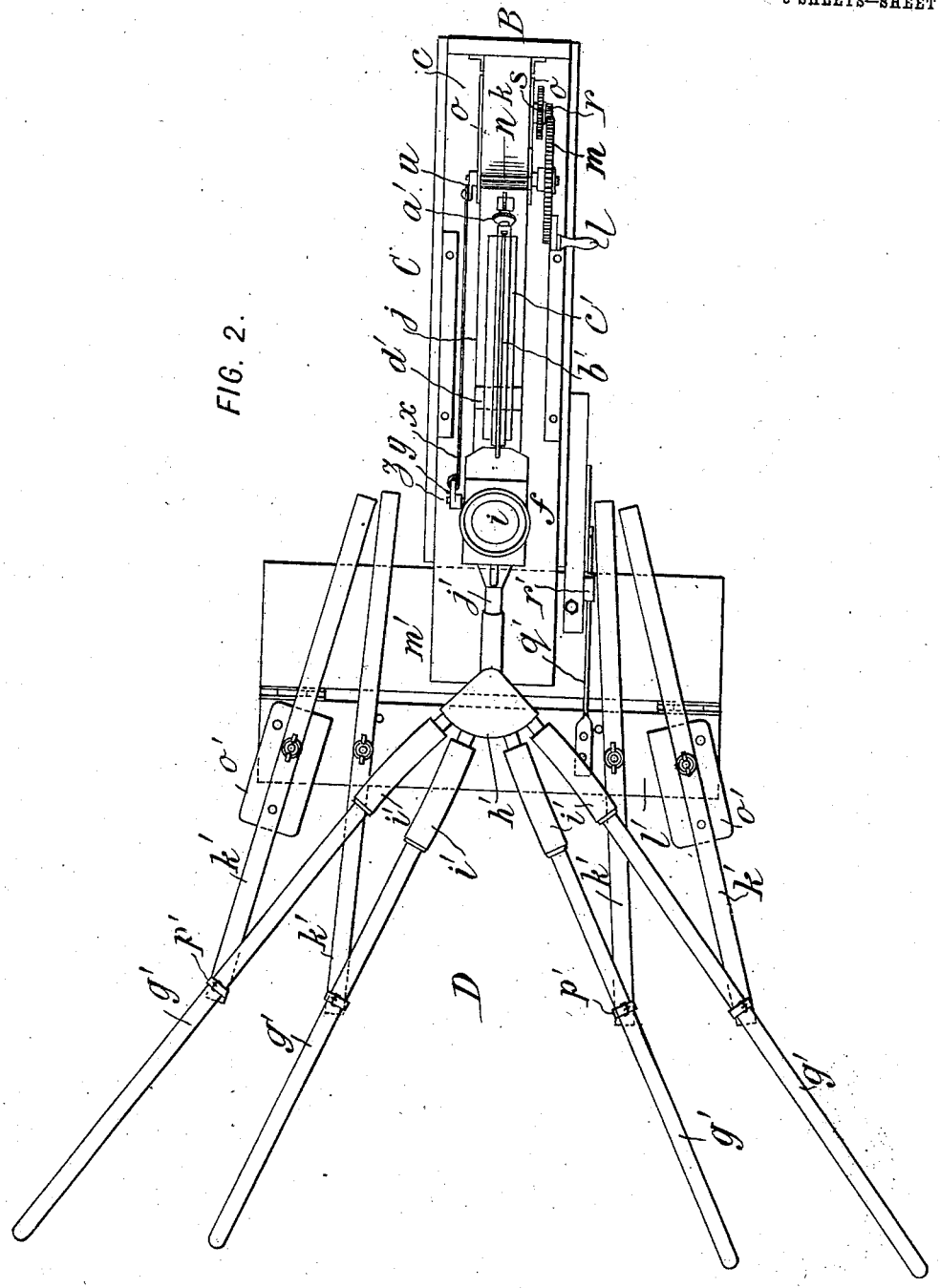
Figure 3:
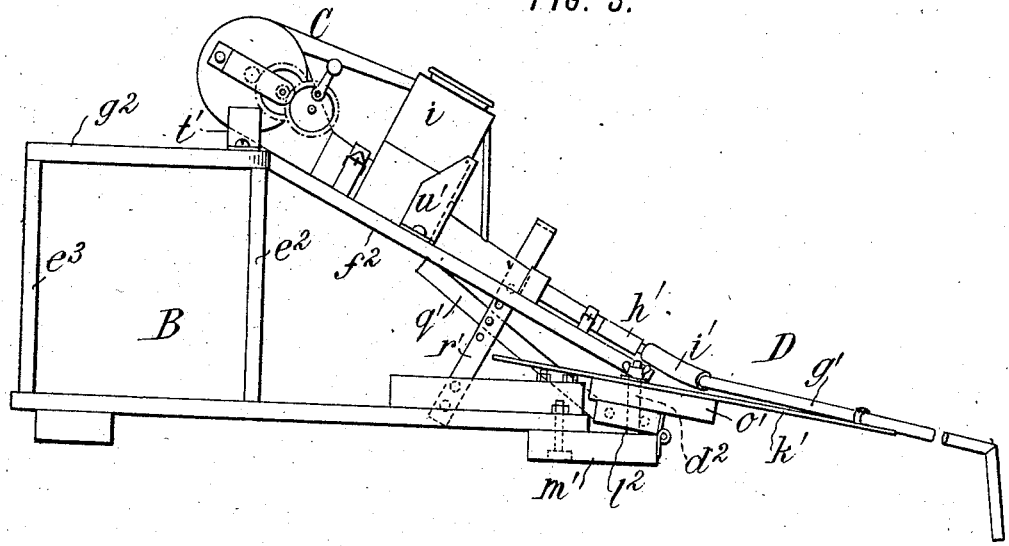
Figure 4:
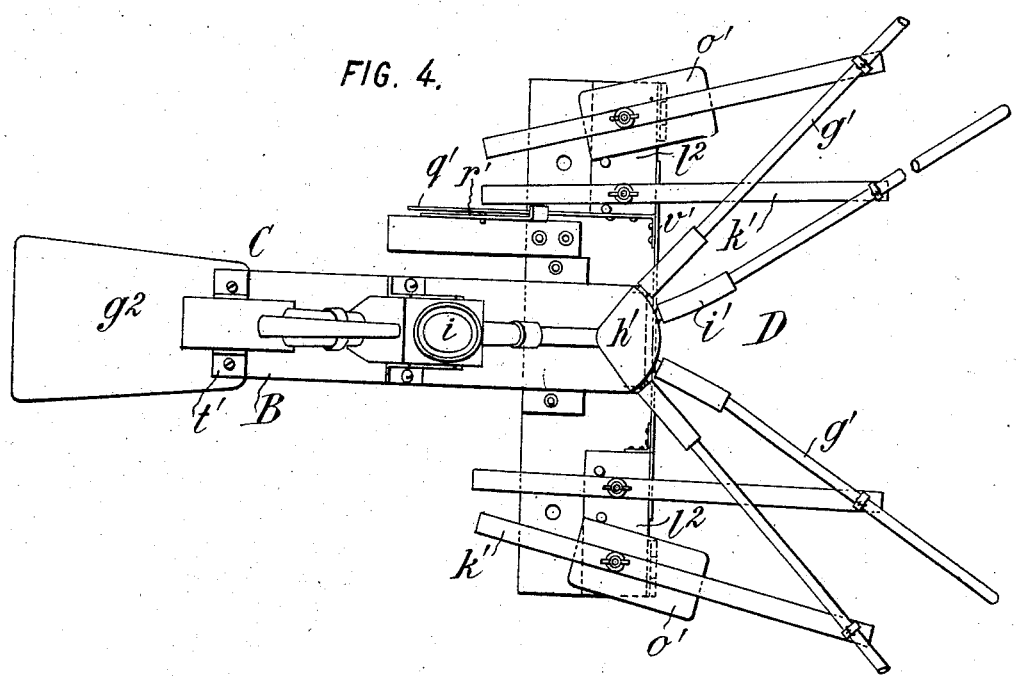

Referring to the drawings, which illustrate several embodiments of my invention, Figure 1 is a side elevation of my improved distributer, which is shown as mounted upon an ordinary farm-vehicle. Fig. 2 is a plan of the device removed. Fig. 3 is a side elevation of a modification. Fig. 4 is a plan of Fig. 3.

Referring to the drawings, let A indicate any suitable vehicle, such as a farm wagon or cart. According to my invention I provide a frame B, which is designed to hold the entire powder-distributer and which may be removably applied to the cart either by permitting it to rest upon the bottom board $a$ of the latter or by bolting or nailing the cross-pieces $b$ of the frame to such bottom board. The frame B is provided with a base $c$, uprights $d\ e$, and top board $f$. The upright $d$ is of less height than the upright $e$, so that the top board is inclined downwardly toward the rear of the device, as shown. The top board $f$ is designed as a support for the driver's seat $g$ and the powder-forcing mechanism C.

The powder-forcing mechanism or duster shown comprises the usual reservoir $i$, from which the powder is fed to a passage $j$, connected with a fan $k$, by means of which a current of air is forced through the passage, carrying with it the powder which has fallen from the reservoir. The device is operated by a handle $l$, fixed to a gear $m$, which is mounted upon a shaft $n$, extending across the top of the fan-casing and mounted in bearings upon two plates $o\ o$, which are soldered or otherwise secured to the fan-casing, as best seen in Fig. 1. One of the plates $o$ is formed with a lug or projection $q$, (shown in dotted lines in Fig. 1,) on which a pinion $r$ is mounted to rotate, such pinion meshing with the gear $m$ and being connected to a gear $s$, which in turn meshes with a pinion $t$, mounted upon the fan-shaft. By this construction a strong and compact means for rotating the fan is obtained. The shaft $n$, upon which the gear $m$ is mounted, is provided at its opposite end with a crank $u$, which is connected by a rod $v$ with a bell-crank $w$, the latter being connected by a rod $x$ to a crank $y$ upon the agitator-shaft $z$, as shown in Fig. 2. As the crank $u$ is rotated the lever $w$ is oscillated and a similar motion given to the agitator through the connections just described. The agitator is of any well-known construction and not shown in detail.

An important feature of the invention is the arrangement of the driver's seat $g$ at rear of the operating mechanism, whereby the driver may guide the horse and at the same time manually operate the distributer. Preferably this result is obtained by lengthening out the duster and placing the seat $g$ between the operating mechanism and the reservoir. The seat is preferably arranged to straddle the passage $j$, so that the operator sits astride the latter, in this position the handle $l$ being within easy reach of the right hand of the operator. By inclining the top board $f$ the operating mechanism is raised relatively to the seat, so that the handle is brought into a more accessible position to the operator, while at the same time the inclination of the duster aids in the discharge of the powder, gravity assisting the air-current in this operation.

Any suitable means may be provided for regulating the passage of powder from the reservoir to the passage $j$—such, for instance, as the usual perforated plate, as shown in dotted lines in Fig. 1. My invention provides, however, an improvement in the means for operating such regulator, such means being best shown in Fig. 2. A thumb-nut or other adjusting device $a'$ is provided, which engages the screw-threaded end of a rod $b'$, which is connected to the regulator, so that by rotating the nut the rod is caused to move backward or forward, as the case may be. To protect the long length of exposed rod, I provide a guard $c'$, which is grooved upon its upper side to receive the rod, so that the latter is practically incased. Such guard may consist of a piece of sheet metal bent to appropriate shape, as shown, or may be otherwise constructed.

I have found in practice that the insecticide tends to accumulate in the passage $j$ near the bottom of the reservoir, so that there is liability of the device becoming clogged at this point. To avoid such a result, I constrict the passage $j$ at a point in its length, preferably by the use of a plate $d'$, which is inserted through a slit formed in the top wall of the passage, as shown. The plate $d'$ is so shaped that when its upper portion fits along the top wall of the passage its lower portion is extended nearly to the bottom of the passage and inclined toward the reservoir. The effect of this is to considerably accelerate the speed of the air-current which passes at this point and by this means to prevent the objectionable accumulation referred to.

The reservoir is preferably provided near its bottom with an opening, which is adapted to be closed by a cap $e'$, as shown in Fig. 1, whereby the interior of the reservoir and agitator are rendered accessible.

My invention is capable of being applied in part to hand-dusters already in use, especially those of the well-known "Champion" type. To effect this, the reservoir and fan, with its operating mechanism, are separated, and an intermediate section of pipe, such as is indicated in dotted lines at $f'$, is inserted between the two. By this means sufficient room is obtained for the interposition of the seat $g$.

The form of distributing mechanism which I prefer to employ is shown at D. Such mechanism comprises a series of pipes $g'$ $g'$, connected at their inner ends to a distributing-nozzle $h'$ by short lengths of flexible hose $i'$ $i'$, and the distributing-nozzle $h'$ fits upon a pipe $j'$, which is connected to the reservoir, so as to provide a separable connection between the two. The distributing-pipes $g'$ are supported by levers $k'$ $k'$, which are pivoted to a tilting member $l'$, which is hinged to a board $m'$, extending transversely below the base-board $c$. The two outer of the levers $k'$ are raised above the inner levers by means of blocks $o'$ $o'$ in order that the ends of the levers may not interfere with each other, as best shown in Fig. 1. Any suitable form of connection may be made between the distributing-pipes and levers—such, for instance, as the straps shown at $p'$ $p'$, which engage the pipes loosely, so as to permit the straps to slide along the latter when the levers are operated. Each of the levers extends forwardly close to the seat $g$, so that the duster may be adjusted to various widths of rows by the driver without leaving his seat or stopping the vehicle. The tilting member $l'$ is adapted to be swung outwardly and downwardly to raise and lower the entire series of pipes by a lever $q'$, fixed to such member and extending forwardly to a point within reach of the driver, a plate $r'$ or other means being provided for holding the lever in its adjusted position. As shown, such plate is formed with a series of holes adapted to receive a pin carried by the lever.

In Figs. 3 and 4 I have illustrated my invention as applied to an ordinary hand-duster of the Champion type. In this construction the inclined support for the duster $f^2$ is arranged between the uprights $d^2$ and $e^2$, while the seat $g^2$ is arranged forwardly of the duster, its front end being supported by an upright $e^3$. The duster is held in place on the support $f^2$ by angle-plates $t'$ and $u'$, the former being fastened to the seat $g^2$ and the latter to the support $f^2$. In the main the construction shown in these figures is similar to that of Figs. 1 and 2. The tilting member $l^2$, however, is formed in two parts connected by a metal strip $v'$, to one of which the lever $q'$ is fastened, as shown. The tilting member instead of extending outwardly from the board $m'$, as in Figs. 1 and 2, in this case extends forwardly over the board. This construction is advantageous in that it permits the device to be placed well forward in the wagon or cart without interfering with the action of the tilting member. Such member is formed in two parts, as described, to avoid interference with the upright member $d^2$.

The construction shown in Figs. 3 and 4 is not as advantageous as that shown in Figs. 1 and 2 for the reason that to operate successfully the driver must face the rear of the cart. Under these circumstance the services of an additional person are required to drive or lead the horse or the horse must be relied upon to properly guide the vehicle.

Although I have described in detail several embodiments of my invention, I do not wish to be limited thereto, as various changes may be made therein without departing from the spirit of the invention.

What I claim is—

1. In an insecticide-distributer the combination of an insecticide-forcing mechanism and a distributing mechanism, means for operating such forcing mechanism, and a seat interposed between said distributing mechanism and said means, and arranged close to the latter so that it may be actuated from said seat.

2. In an insecticide-distributer the combination of a vehicle, an insecticide-forcing mechanism thereon, such mechanism having a reservoir and an operating mechanism, and a seat interposed between the two and arranged close to said operating mechanism so that the latter can be operated from said seat.

3. In an insecticide-distributer, the combination of a vehicle, a powder-forcing mechanism thereon, such mechanism having a reservoir and a fan, such reservoir and fan being spaced apart and arranged with the fan in advance of the reservoir, a seat interposed between such fan and reservoir, and facing the former, and means for actuating such mechanism arranged close to said seat so as to be operated therefrom while the operator is facing forwardly in said seat.

4. In an insecticide-distributer, the combination of a frame adapted to be removably applied to a cart or the like, said frame having an inclined support, and a powder-forcing mechanism fixed to said support.

5. In an insecticide-distributer, the combination of a base-board, a powder-distributing mechanism having a series of pipes, a tilting member by the movements of which such pipes are raised and lowered, and connections between such member and said pipes, said tilting member being hinged to said base-board, and extending rearwardly therefrom.

6. In a powder-distributer, a reservoir having a means for regulating the passage of powder therefrom, an operating-rod extending to a point remote therefrom and a guard for protecting such rod comprising a piece of metal bent to form a groove in which such rod is arranged.

In witness whereof I have hereunto signed my name in the presence of two subscribing witnesses.

CLINTON H. LEGGETT.

Witnesses:
 EUGENE V. MYERS,
 FRED WHITE.